United States Patent [19]

Moderatho

[11] 4,110,924
[45] Sep. 5, 1978

[54] MOUNT FOR X-RAY FILMS

[75] Inventor: Bo Moderatho, Lidingö, Sweden

[73] Assignee: Bo Moderatho & Company AB, Lidingo, Sweden

[21] Appl. No.: 748,328

[22] Filed: Dec. 7, 1976

[51] Int. Cl.² ............................................. G09F 1/12
[52] U.S. Cl. ................................................... 40/158 B
[58] Field of Search ..................... 40/152, 159, 158 B, 40/158, 106.1, 63 A, 64 A, 70 A

[56] References Cited

U.S. PATENT DOCUMENTS

| | | | |
|---|---|---|---|
| 1,500,025 | 7/1924 | Mayer | 40/158 B X |
| 2,775,050 | 12/1956 | Ellsworth | 40/159 |
| 3,069,795 | 12/1962 | Lieberman | 40/152 |
| 3,564,745 | 2/1971 | Johnson et al. | 40/158 B |
| 3,949,505 | 4/1976 | Kato | 40/152 |

Primary Examiner—Louis G. Mancene
Assistant Examiner—Wenceslao J. Contreras

Attorney, Agent, or Firm—Strauch, Nolan, Neale, Nies & Kurz

[57] ABSTRACT

A flat laminated sheet made from two sheets of plastic or cardboard and a third intermediate spacer sheet which is the thickness of a film such as a dentist X-ray film. The outer sheets have one or more rectangular openings positioned opposite each other, the opening of one sheet having a greater height dimension and lesser width dimension than an X-ray film and the other opening having a greater width dimension and lesser height dimension than an X-ray film so one sheet will have supporting rim portions for the film at top and bottom and the other will have supporting rim portions for the film at the sides. The intermediate spacer sheet at each opening can be weakened at margins essentially equal to the dimensions of a film so a screening portion of the spacer sheet can be removed for insertion of a film and replaced if a film is removed. There are several forms of shapes of the side edges of the upper viewing opening and a small auxiliary film inserting tool can be used to aid proper film insertion into the mount.

2 Claims, 15 Drawing Figures

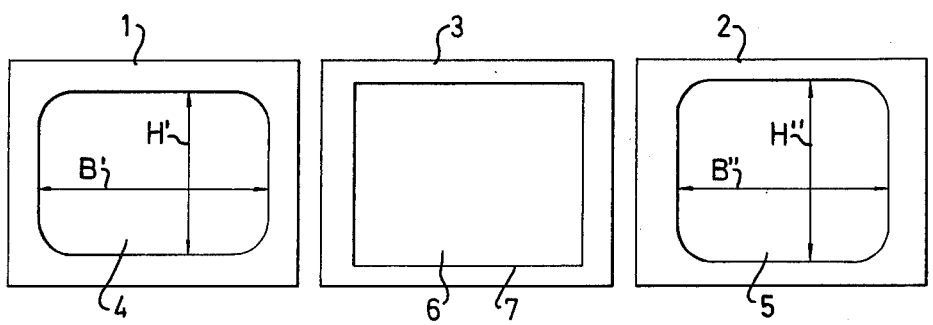
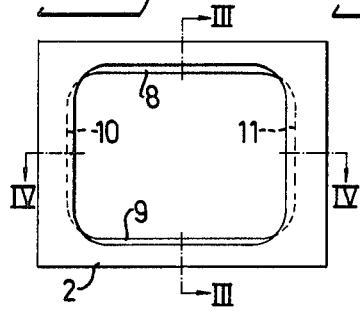
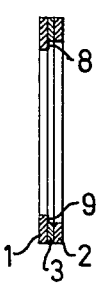
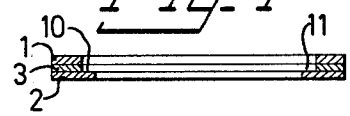
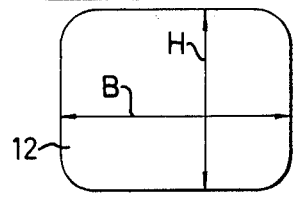
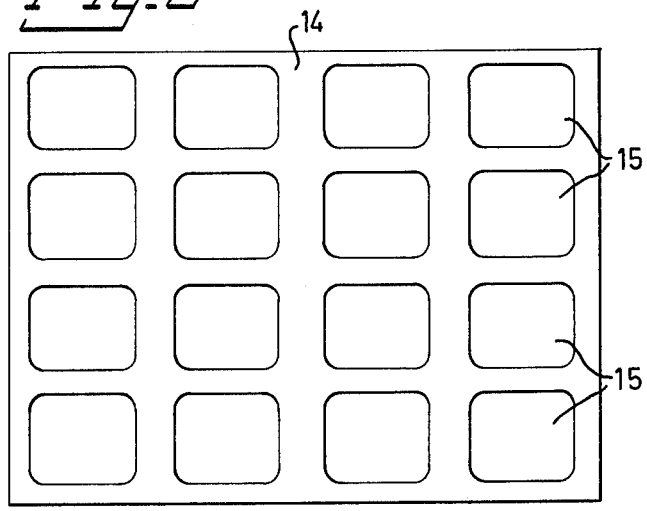

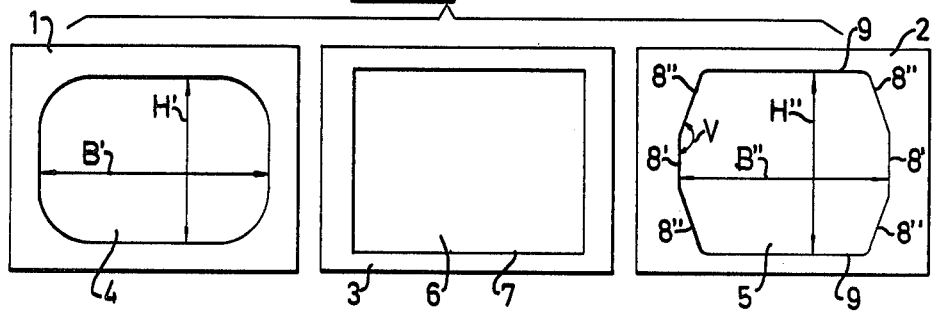
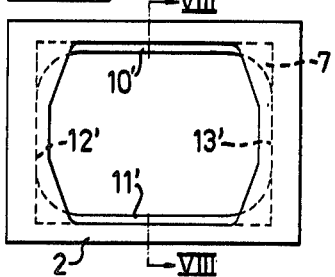 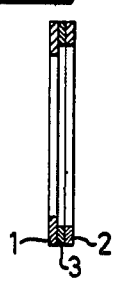 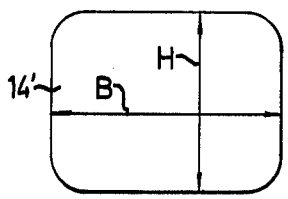
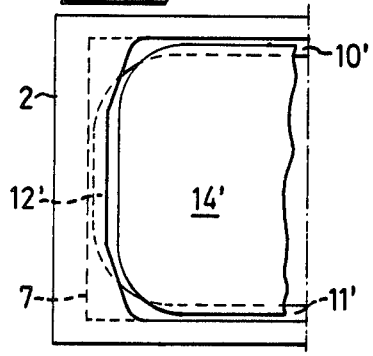 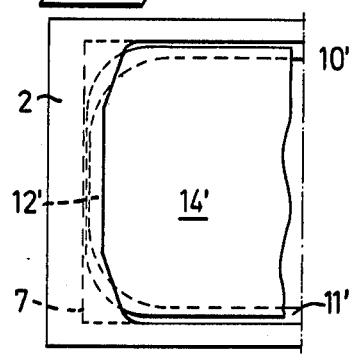
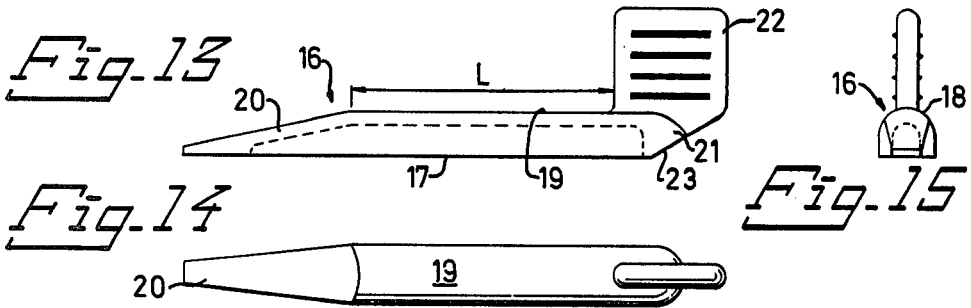
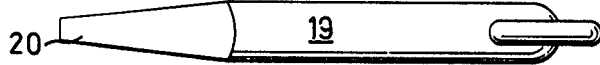

MOUNT FOR X-RAY FILMS

The present invention concerns a mount for one or more X-ray films especially of the small size used when taking X-ray photographs of teeth and studied by the dentist after exposure, development and fixing.

It is known when studying X-ray films to place the film on a viewing table with high light intensity, but in such a case one will often get dazzled by light coming out at the edges of the film and thereby some details on the film may get lost for the observing eye. In order to avoid this inconvenience it is also known to use plastic mounts with a reasonably large opening and slots at the opening for mounting a film that has been put in. Such a mount is, however, unnecessarily costly to manufacture and the introducing and removing of the film is rather troublesome and the film will thus often get damaged or soiled by fingerprints or the like. The mount may have a plurality of openings and if films are placed in only a few of these openings the other openings will allow light to pass and this will be troublesome for the dentist or other person who studies the film.

The present invention has as object to provide a mount that preferably is equipped with a plurality of openings for films but will not allow light to pass through such openings which have no films to study and further allows a convenient introducing and removing of films and also is simple to manufacture.

This object is, according to the present invention solved for a mount for one or more X-ray films where the mount includes two opaque rigid sheets of plastic or cardboard or the like and between said sheets a spacer or insert of, for instance, paper with substantially the same thickness as the thickness of the X-ray films for the said mount, with each of said sheets having a plurality of substantially rectangular or square openings, with such openings positioned just opposite each other, with the openings in the lower of the sheets having a height a little smaller than the height of the film and a width slightly larger than the width of said film and with the openings in the upper sheet having a height slightly larger than the height of the film and a width slightly smaller than the width of the film, so that the said lower sheet will have two opposite supporting rims for one face of the film along two of the opposite edge portions of said film and the upper sheet will have two opposite supporting rims for the other face of said films along the other two opposite edge portions of the film. The invention is specially characterized by the fact that said spacer just opposite the openings in said sheets has by weakening lines marked removable screening parts with substantially the same area as the area of the film and that such a removed screening part is reinsertable in the mount so that an opening formed by the removal of a screening part may be covered.

According to a modification of the invention the upper sheet has the lateral edges formed by a straight middle edge part and on each side of this substantially straight lateral edge parts forming an angle of about 160° with the middle edge part and with the lateral edge parts together having a length that is greater than the length of the middle edge part.

In order to make the invention more easy to understand non-limiting embodiments of the invention will be described with reference to the accompanying drawings, where:

FIG. 1 shows a plan view of the components of a mount according to the invention with said components shown separately.

FIG. 2 is a plan view of the mount consisting of the components shown in FIG. 1.

FIGS. 3 and 4 show section views taken along the lines III—III and IV—IV in FIG. 2.

FIG. 5 is a view of an X-ray film.

FIG. 6 is a plan view of a mount according to the invention for mounting a plurality of films simultaneously.

FIG. 7 is a plan view of the components of a modified mount according to the invention with said components shown separately.

FIG. 8 is a plan view of the mount consisting of the components shown in FIG. 7.

FIG. 9 is a section view taken after the line VIII—VIII in FIG. 8.

FIG. 10 is a view of an X-ray film and corresponds to FIG. 5.

FIGS. 11 and 12 show in a larger scale a part of the mount during the insertion of an only partly shown film.

FIGS. 13, 14 and 15 show a supporting tool for the mount by a side view, a plan view and an end view respectively.

According to the present invention the mount shown in FIG. 1 comprises two sheets 1 and 2 of opaque rigid plastic or cardboard, suitably of grey colour, and a spacer 3. The sheet 1 has an opening 4 with a height H' a little smaller than the height H of the film 12 shown in FIG. 5 and with a width B' only a little larger than the width B of the film 12. The sheet 2 has an opening 5 with a height H" only a little larger than the height H of the film 12 and with a width B" a little less than the width B of the film 12.

The spacer 3 may consist of paper with a thickness that preferably is only a little greater than the thickness of the film 12. In the spacer 3 is a section marked by a weakening line 7. Removal of the section marked by line 7 leaves an opening 6 which has substantially the same or a little larger area than the area of the film 12 and is for the sake of simplicity shown with corners having right angles. The openings 4,5 in the sheets 1 and 2 have in contrast thereto rounded corners mainly corresponding to the corners of the film 12.

In FIGS. 2–4 the parts or components 1, 2 and 3 are shown mounted together with the openings 4,5 and 6 just opposite each other, with a section delimited by the weakening line 7 having been pushed out. Owing to the said dimensional relations for the openings 4 and 5 there is on the lower sheet 1 formed two opposite supporting rims 8 and 9 for one face of the film 12 and on the sheet 2 two opposite supporting rims 10 and 11 for the other face of the film 12. From FIG. 2 it is evident that the supporting rims 8 and 9 support two of the edge portions of the film 12 and that the supporting rims 10 and 11 support the other two edge portions of the film 12.

The advantages with the mount according to the invention are specially that the sheets 1 and 2 in the mount effectively superpose all the edges of the film and that thus no slit that may pass disturbing light can come into existence along the edges of the film, that further the film is easily introduced and removed and that the mount is simple and cheap to manufacture.

In order to show the invention as clearly as possible there is shown a mount for only one film in FIGS. 1 to 4 inclusive but the intention is that the mount is to have a plurality of openings for a number of films.

In FIG. 6 is shown a mount 14 formed as already has been stated and with a considerable number of openings 15 for films. A mount 14 with the approximate dimensions 22×30 centimeters may have 16 openings 15 so that, after the screening parts of the spacer have been pushed out, exposed, developed and fixed inserted films represent a complete teeth status for a person. If only a lesser number of films are to be studied the screening parts of the spacer are allowed to remain in such openings that are not used and the passage of light will be prevented. If one film or several films are removed from the corresponding opening or openings these openings may be covered by reinserting the said screening parts of the spacer.

According to a modification shown in the FIGS. 7 to 12 inclusive, the shape of the openings in the sheets 1 and 2 have been given a somewhat modified configuration.

According to the modification the openings 5 in the upper sheet 2 — see FIGS. 7 to 12 inclusive — have the short lateral edges formed by a straight middle edge part 8′ and on each side of this part there are substantially straight lateral edge parts 8″ forming an angle V of about 160° with the said middle edge part 8′ and the said parts 8″ are connected to respective longer side edges 9 in the opening 5.

In FIGS. 8 and 9 the components 1, 2 and 3 are shown mounted together with the openings 4, 5 and 6 just opposite each other, with the part of the spacer 3 indicated by the weakening line 7 being pushed away. The stated dimensional relations for the openings 4 and 5 provide that on the lower sheet 1 there are formed two supporting rims 10′ and 11′ for one face of the film 14′ and on the upper sheet 2 there are formed two opposite supporting rims 12′ and 13′ for the other face of the film 14′.

The introduction of a film in the said mount is done in the following way as shown in FIGS. 11 and 12. One end of the film 14′ is moved down in the opening 5 of the upper sheet 2 so that the rounded corners of the film strike against the lateral edge parts 8″ by point contact as shown in FIG. 11, and then this part of the film falls down from the edges 8″ against the supporting rims 10′, 11′ on the lower sheet 1 and is inserted under the supporting rim 12′ on the lower side of the upper sheet 2 as shown in FIG. 12.

The advantage of the straight lateral edge parts 8″ is that the rounded corners on the film are easily guided towards and have substantially only point contact with the lateral edge parts 8′ and may with very small friction resistance glide down past the edges 8″ and in on the supporting rim 12′ that is positioned behind said edges.

In order to insert the other end of the film 14′ in a similar way under the supporting rim 13′ there is used a supporting tool according to FIGS. 13 to 15 inclusive.

This supporting tool 16, preferably of plastic, is shaped as a pin with a substantially plane bottom side 17 and has in cross-section a convex curved top side 18 and a middle part 19 with uniform height and from this part goes a gradually sloping end part 20 and a second end part 21 having a handle 22. At the said end part 21 on the bottom side of the same there is a bevel 23. The length L of said middle part 19 is a little greater than the height H of the film 14′ and its height h is suited for cooperation with the mount and the film as will be described. The gradually sloping end part 20 is sufficiently long and has a sloping that is sufficiently gradual for the function to be described.

When the other end of the film 14′ is to be inserted under the supporting rim 13′ the supporting tool 16 is positioned under the film 14′ and directly on the mount and straight across the width B″ of the opening 5 and with the middle part 19 over the opening 5. The film 14′ is thereafter bent over the curved upper side 18 of the middle part 19 and the free end of the film will then owing to the chosen height of the middle part 19 go down along the lateral edge parts 8″, and in connection with a following withdrawal of the supporting tool, with the gradually sloping end part 20 permitting a gradual sinking down of the film, the end of the film will be pushed in under the supporting rim 13′ by a pressure acting on the upper side of the film. The bevel 23 guarantees that the supporting tool at its withdrawal will not get caught in an adjacent film or edge on an opening when the mount has a plurality of openings side by side for films.

The invention is not restricted to the shown and described embodiments and the end may have no middle lateral edge part and thus have only the two straight lateral edge parts. Further the shape of the supporting tool and its handle may be modified.

What I claim is:

1. Mount for viewing X-ray films and the like including: two opaque rigid sheets and, secured between said opaque sheets, a spacer sheet having substantially the same thickness as the thickness of the films to be viewed, each of said opaque sheets having at least one substantially rectangular opening, and together providing a set of openings positioned opposite each other, the opening in one opaque sheet having a height dimension smaller than the height of the film to be viewed and a width dimension larger than the width of the film to be viewed and the opening of said set in the other opaque sheet having a height larger than the height of the film and a width smaller than the width of the film, providing said one opaque sheet with two opposite film supporting rim portions for one face of a film along two opposite side edge portions of said film and said other opaque sheet with two opposite film supporting rims for the other face of the film along the other two opposite edge portions of the film; said spacer sheet having weakening lines which enable parting and removal of a screening spacer sheet part having substantially the same length and width dimensions as that of the film whereby a removed screening part may be reinsertable in the mount so that the set of openings in said opaque sheets formed by the removal of a screening part may be covered.

2. A viewing mount as defined in claim 1, wherein said at least one opening in said one sheet has the shorter of the opposed lateral edges formed by a straight middle edge portion and the edge at each end of said middle edge portion being substantially straight lateral edge portions forming an angle of about 160° with the middle edge portion said end lateral edge portions, together having a length that is greater than the length of the middle edge portion.

* * * * *